July 21, 1925.

H. B. McKAHIN

DISK HARROW

Original Filed Jan. 26, 1920

July 21, 1925.  
H. B. McKAHIN  
DISK HARROW  
Original Filed Jan. 26, 1920

Witness:  
E. Wilderson

Inventor:  
Herbert B McKahin  
by H. H. Bliss  
Attorney

Patented July 21, 1925.

1,546,546

UNITED STATES PATENT OFFICE.

HERBERT B. McKAHIN, OF MOLINE, ILLINOIS, ASSIGNOR TO DEERE & COMPANY, OF MOLINE, ILLINOIS, A CORPORATION OF ILLINOIS.

DISK HARROW.

Application filed January 26, 1920, Serial No. 354,194. Renewed July 21, 1924.

*To all whom it may concern:*

Be it known that I, HERBERT B. McKAHIN, a citizen of the United States, residing at Moline, in the county of Rock Island and State of Illinois, have invented certain new and useful Improvements in Disk Harrows, of which the following is a specification, reference being had therein to the accompanying drawing.

This invention relates to disk harrows and particularly to that type of disk harrow which works the soil twice at each traverse of the field. Such implements are commonly known as double action disk harrows and are characterized by having two sets of disk gangs pivotally coupled together, one set of disk gangs behind the other, usually the disks of the forward gangs being arranged to throw the soil outwardly while the disks of rearward or trailing gangs are arranged to throw the soil inwardly, thus leaving the soil in a level condition after the passage of the implement thereover. As the extent to which the disks penetrate the soil is governed largely by the angle to which the disks are set relative to the line of advance, and as changes in the character and condition of the soil require adjustment of the cutting angle of the disks to obtain the proper execution upon the soil, it is considered desirable to provide means whereby the operator can at all times readily control the angle of the disks of either the forwardly or rearwardly sets of gangs and the improvement of such controlling means is the principal object of my invention. Other objects of the invention will be manifest from a reading of the specification, drawings and claims.

Of the accompanying drawings which illustrate the preferred form of the invention and in which like numerals indicate identical parts.

Figure 4 is a vertical longitudinal section on line 4—4 of Figure 1.

Figure 1:
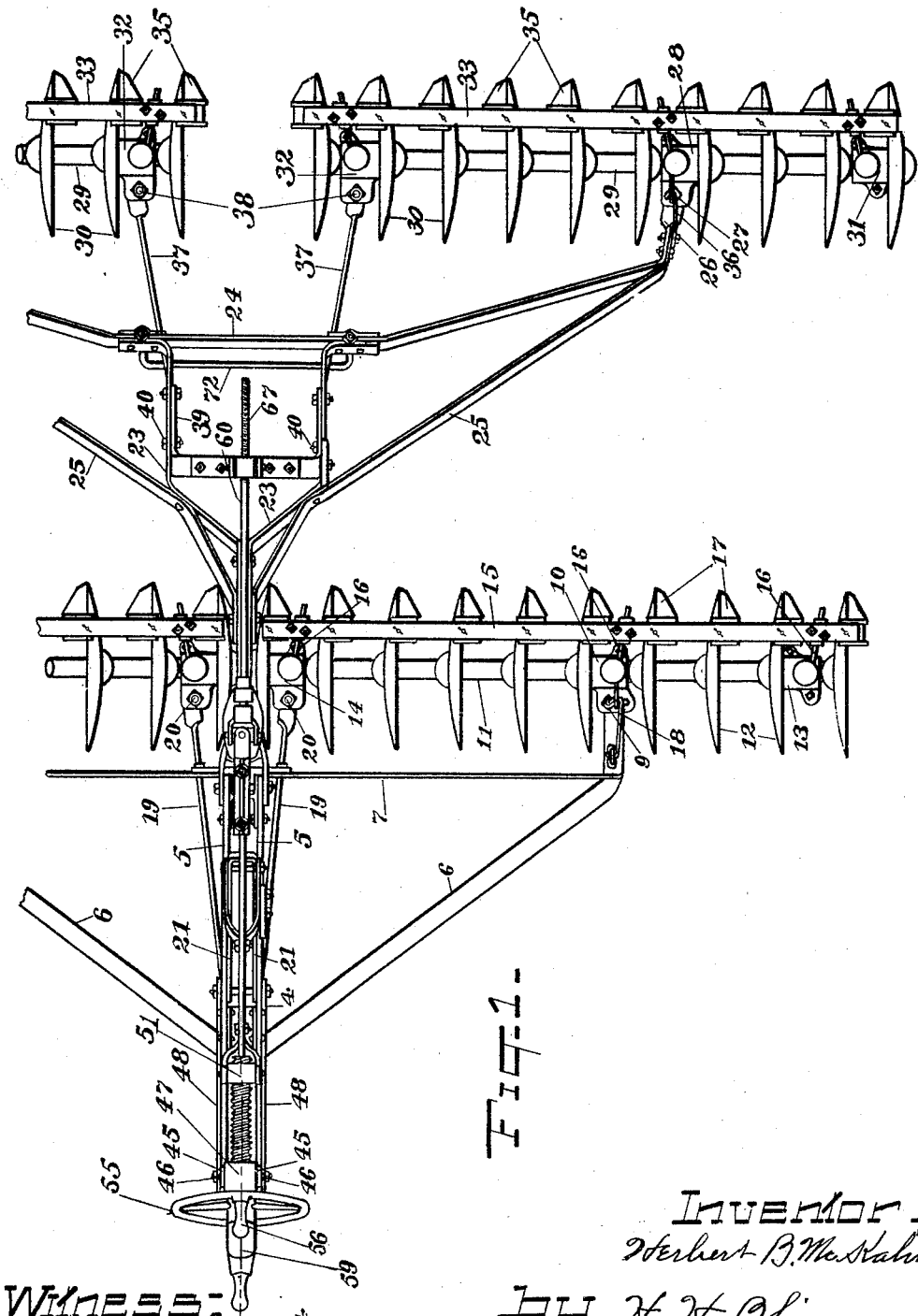
Figure 1 is a plan view, the disk gangs being shown in transverse alinement, the outermost ends of the gangs at one side being broken away.

Referring to the drawings:

5—5 indicate spaced parallel bars forming the main draft member of the front draft frame. Secured to the draft bars 5—5 are frame bars 6—6 that extend rearwardly and diverge outwardly and downwardly, the rear ends joining the horizontally turned end portions of an arched transverse frame bar 7, the transverse bar 7 being connected with the bars 5—5 by a suitable bracket 8, as best seen in Figure 1.

Pivotally and slidably connected with the end portions of the frame bars 6 and 7 as indicated at 9, is a bearing 10, in which is revolvably mounted a shaft 11, there being fixed to the latter transversely spaced concavo-convex disks 12. Each disk carrying shaft 11 is provided with an outer bearing 13 and an inner bearing 14. 15 is a scraper carrying bar supported on arms 16 extending upwardly from the bearings 10, 13 and 14. 17 indicate scrapers mounted on the bars 15 and arranged to engage with the concave faces of the disks 12. 18 indicates a bracing means extending from the horizontally turned portions of the bars 6 and 7 to the center arm 16 of each gang for the purpose of holding the scraper frame in position.

The set of parts at either of the machine consisting of the shaft 11, disks 12 and the bearings 10, 13 and 14 together with their associated parts are each considered a gang.

The inner disks 12 of each gang are provided on their convex faces with suitable bumpers to receive the end thrust of the opposed gangs as is usual in disk harrows of this type.

The degree of angularity of the disk gangs when at work, that is to say, their cutting positions are controlled, or the gangs may be adjusted to their non-cutting positions, as shown in Figure 1 of the drawings, by the usual links 19—19 pivotally connected, as at 20, with the inner bearings 14—14 of each gang, the forward ends of the links being pivotally connected with lever 21, pivoted at 22 between the draft bars 5—5. The means for operating the lever 21 to adjust the position of the disk gangs connected with the front frame will be hereinafter more specifically described.

The rear harrow comprises a main draft frame formed of bars 23—23 having their forward portions secured together, their rear portions being separated and secured to a transverse frame bar 24, as best seen in Figure 1. 25—25 are brace bars secured at their forward ends to the main draft bars 23—23 and diverging outwardly and downwardly to a point of juncture with the outer ends of the transverse frame bar 24. The transverse bar 24 at each of its ends has a portion turned as indicated at 26 to pivotally connect at 27 with a bearing 28 for each gang and in each of said bearings is revolvably mounted a shaft 29 there being fixed to the latter transversely spaced concavo-convex disks 30. Each disk carrying shaft is provided with an outer bearing 31 and an inner bearing 32. 33—33 are scraper carrying bars supported on arms 34 extending upwardly from the bearings 28, 31 and 32 of each gang. 35 are scrapers mounted on the bar 33 and adapted to engage with the concave faces of the disks 30. 36 indicates a bracing means extending between the end portion of the bars 24—25 and the center arm 34 of each gang for holding the scraper frames in position.

Figure 2:
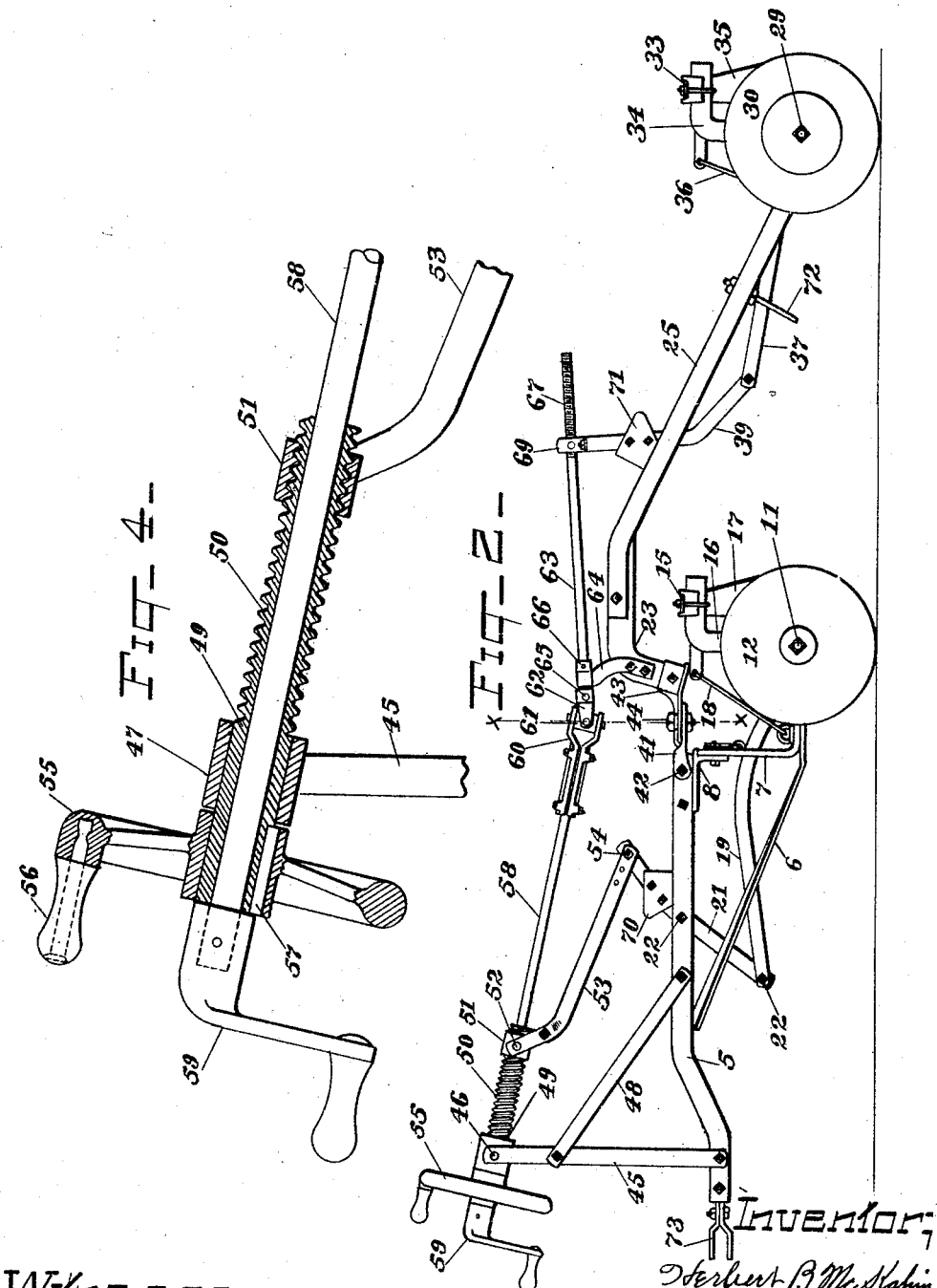
Figure 2 is a side elevation of the parts as shown in Figure 1.
Figure 3:
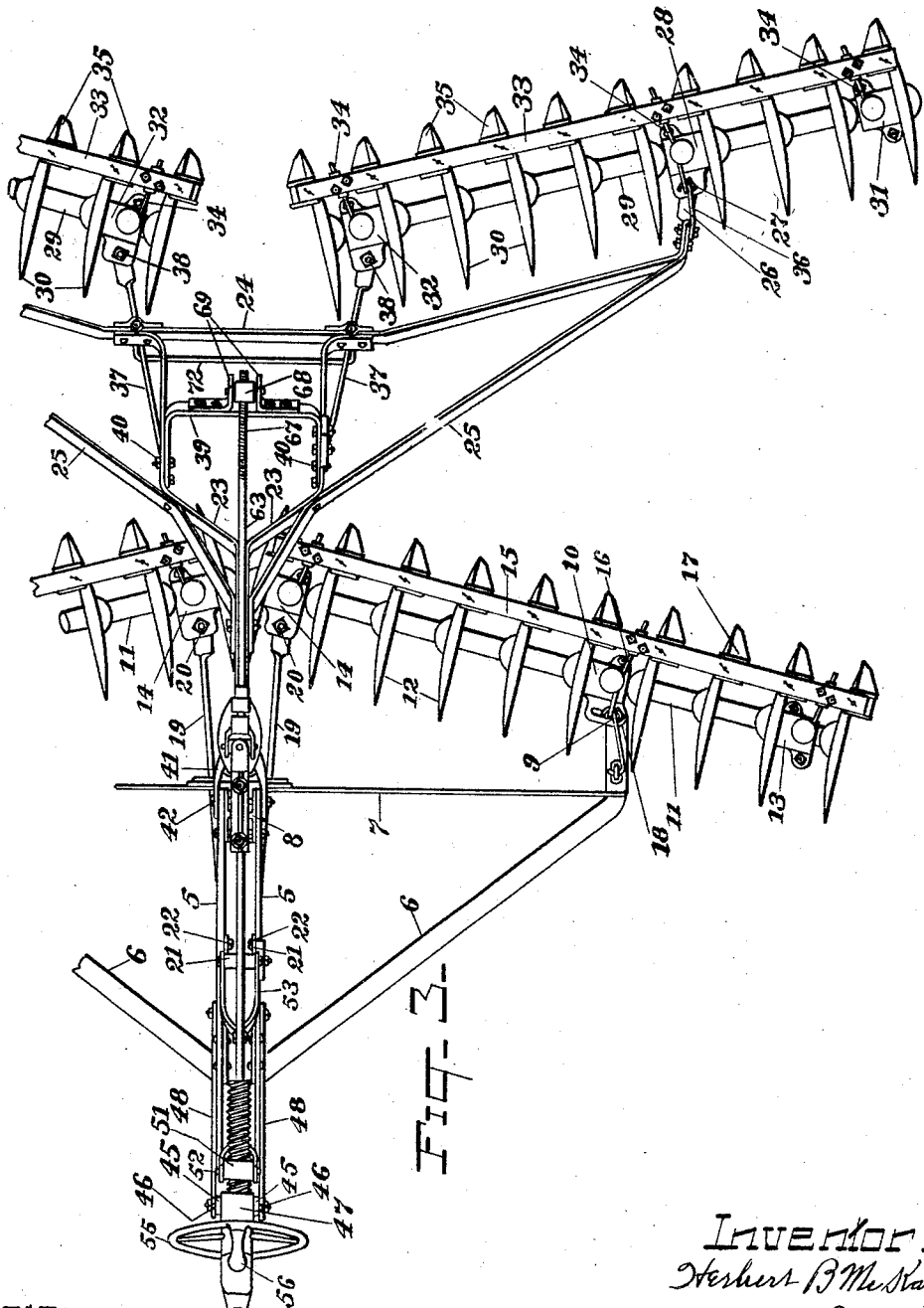
Figure 3 is a plan view but with the disk gangs adjusted to angled or cutting position, the outermost ends of the gangs at one side being broken away.

The set of parts at either side of the machine consisting of shafts 29—29, disks 30, and the bearings 28, 32 and 33 together with their associated parts are each considered a gang. The degree of angularity of the rear pair of disk gangs when at work, that is to say, their cutting positions are controlled, or the gangs may be adjusted to their non-cutting positions, as shown in Figure 1 of the drawings, by the usual links 37 pivotally connected as at 38, with the inner bearings 32—32 of each gang, the forward ends of the links being pivotally connected with the open ends of a substantially U-shaped lever 39 pivoted at 40 between the separated ends of the frame bars 23—23. The means for operating the lever 39 to adjust the position of the rear disk gangs connected with the rear frame will be hereinafter more specifically described. The rear frame and its gangs are connected with the front frame and its gangs by a flexible or universal coupling comprising a member 41 pivoted at 42 upon a transverse horizontal axis, and a member 43 secured to the downwardly turned forward ends of the rear frame bars 23—23, the two members being pivotally connected as at 44, best seen in Figure 2, to provide a vertical axis between the frames and their gangs to permit the harrow to be readily turned. There is sufficient looseness in the horizontal axis 42 and the vertical axis 44 to permit the frames to rock relative to each other when the implement is used on rough ground. While I refer to the frames as being connected or coupled pivotally, it will be understood that I do not limit myself to the specific form of pivot devices for attaining the desired flexibility in the connection between the rear frame and the front frame.

Farmers who have tractors usually employ the tractor for drawing their harrows of this type and it is the purpose of the invention to provide means whereby the operator of the tractor without leaving his station thereon can readily control the levers 21 and 39 and thereby adjust the degree of angularity of the sets of gangs of either of the frames, each independently of the other, or adjust the sets of gangs to transversely alined non-cutting position. The means for operating the levers 21 and 39 which comprise unitarily mounted, but separately operable, self locking devices will now be described.

Extending upwardly from the front frame bars 5—5 and near the forward ends thereof are supports 45—45, between the upper extremities of which is mounted upon pivots 46—46 a journal block 47. 48—48 are braces connected with the frame bars 5—5 and connected with the supports 45—45 to hold the supports upright relative to the frame bars. Revolvably mounted in the journal block is a hollow member 49, best seen in Figure 4, the member rearwardly of the journal block being exteriorly threaded as indicated at 50. Mounted upon the threaded portion of the member 49 is a threaded nut 51 having pintles 52, with which are pivotally connected the bifurcated ends of a link 53, the other end of the link being bifurcated and pivotally connected with the lever 21 as indicated at 54. A handwheel 55, provided with a handhold 56 is suitably secured as with a key 57 to the member 49 forwardly of the journal block 47 and furnishes means whereby the member 49 can be rotated in either direction. Extending through the hollow member 49 and revolvably supported therein is a shaft 58, having pinned to its forward end a hand crank 59 by means of which the shaft may be rotated in either direction independently of the member 49. To the rearward portion of the shaft 58 is secured a forked member 60 and in the fork of which is pivotally mounted a set of pintles of a universal joint coupling block 61 of a well known type, the other set of pintles carried by the block 61 being pivotally mounted in the forked ends of a member 62 pinned to a shaft 63, the latter at its forward end being rockingly supported in a bracket 64 secured to and extending upwardly from the forward ends of the rear frame bars 23—23. While the shaft 63 is mounted in its supports 64 to rock sufficiently to perform its functions, yet it is limited with respect to endwise movement through its support by the sleeve like portion 65 of the forked member forwardly of the support 62 and a collar 66 pinned to the shaft rearwardly of the support. The rearward portion of the shaft 63 is threaded as indicated at 67 to receive a threaded nut 68, the latter having pintles that pivotally engage with brackets 69 secured to the transverse portion of the U-shaped lever 39.

By turning the handwheel 55, the member 49 is rotated and the threaded nut 51 will feed along the threads 50, the link 53 connecting with the nut and the lever 21, striking the latter which by means of the link connections 19—19 with the inner bearings 14—14 of the front disk gangs will adjust the gangs back and forth about the pivots 9—9 depending upon the direction the member 49 is rotated. By turning the crank member 59 the shafts 58 and 63 are rotated and the threaded nut 68 will feed along the threaded portion of the shaft 63 and stroke the lever 39, which by means of the link connections 37—37 with the inner bearings 32—32 of the rear disk gangs will adjust the gangs back and forth about the pivots 27—27 dependent upon the direction the crank is turned. It will be noted the threads 50 are formed at a reverse angle to the threads on the rearward portion of the shaft 63, therefore the turning of the hand wheel 55 and the crank 59 in the same direction will act to adjust the inner ends of one set of gangs rearwardly while the inner ends of the other set of gangs are adjusted forwardly, as is customary and desirable in harrows of this type; furthermore as the threads are formed at a non-coasting angle, the gangs will be held in the position to which they have been adjusted by the turning of the wheel and crank and without the employment of any supplemental locking devices. 70 indicates a stop secured to the lever 21 and adapted to engage one of the frame bars 5 to limit the movement of the lever in either of the extreme adjusted positions of the front disk gangs. 71 indicates a stop secured to the lever 39 and adapted to engage one of the frame bars 23 to limit the movement of the lever in either of the extreme adjusted positions of the rear disk gangs. 72 is a stirrup depending from the transverse frame bar 24 to limit the downward movement of the inner ends of the rear disk gangs when operating over extremely rough ground. 73 indicates a clevis secured to the front frame 5—5 to provide suitable hitch connection with the tractor or draft means. It will be noted the universal joint between the shafts 58—63 is located in the vertical line (line X—X, Fig. 2) of the pivot 44, which couples the front and rear gang frames, and therefore the harrow may readily turn at corners at the end of field traverses, the frames angling at such time relative to each other about the pivot 44. During such turning movement the adjusting mechanism for the rear gangs adapts itself to the angle established between the frames and if desired may be operated to adjust the gangs while the turn is being made.

What I claim is:

1. The combination of two disk harrow units pivotally connected in tandem relation and including frames and adjustable disk gangs, devices carried by each harrow unit adapted to be operated to adjust the gangs thereof, and independently operable rotatable means unitarily mounted on one of said harrow units for operating the adjusting devices of one harrow unit independently of those of the other.

2. The combination of two disk harrow units pivotally connected in tandem relation and including frames and adjustable disk gangs, devices carried by each harrow unit adapted to be operated to adjust the gangs thereof, and independently operable rotatable means unitarily mounted on the front harrow unit for operating the adjusting devices of one harrow unit independently of those of the other 3. The combination of two disk harrow units pivotally connected in tandem relation and including frames and adjustable disk gangs, devices carried by each harrow unit adapted to be operated to adjust the gangs thereof, and independently rotatable means unitarily mounted on the front harrow unit one within the other and operable to actuate the adjusting devices of one harrow unit independently of those of the other.

4. The combination of two disk harrow units pivotally connected in tandem relation and including frames and adjustable disk gangs, devices carried by each harrow unit adapted to be operated to adjust the gangs thereof, and dual means unitarily mounted on the front harrow unit concentrically about a common axis and independently rotatable to actuate the adjusting devices of one harrow unit independently of those of the other 5. The combination of two disk harrow units pivotally connected in tandem relation and including frames and adjustable disk gangs, devices carried by each harrow unit adapted to be operated to adjust the gangs thereof, a tubular shaft rotatably mounted in fixed position on the front frame and connected to the adjusting devices of the front gangs, a shaft rotatable within the tubular shaft and connected to the adjusting devices of the rear gangs, and means manually operable to rotate said shafts independently to actuate the adjusting devices to which they are respectively connected.

6. The combination of two disk harrow units pivotally connected in tandem relation and including frames and adjustable disk gangs, devices carried by each harrow unit adapted to be operated to adjust the gangs thereof, a tubular shaft rotatably mounted in fixed position on the front frame and connected to the adjusting devices of the front gangs, a shaft rotatable within the tubular shaft and having a flexible connection with the adjusting devices of the rear gangs, and means manually operable to rotate said shafts independently to actuate the adjusting devices to which they are respectively connected.

7. In a disk harrow, a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices adapted to be operated to adjust said rear gangs, and unitarily mounted independently operable means for operating said gang adjusting devices.

8. In a disk harrow, a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices adapted to be operated to adjust said rear gangs, and independently operable co-axially mounted means for operating said gang adjusting devices.

9. In a disk harrow, a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices adapted to be operated to adjust the rear gangs, devices carried by said front frame for operating the adjusting devices of the gangs connected with one of the frames, and independently operable means extending through the first mentioned operating means for operating the adjusting devices of the gangs of disks connected with the other frame.

10. In a disk harrow, a front frame, gangs of disks connected with said frame and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices adapted to be operated to adjust said rear gangs, means mounted on the front frame for operating the adjusting devices of the gangs connected with one of the frames, and means supported by said first mentioned operating means but operable independently thereof for operating the adjusting devices of the gangs connected with the other frame.

11. In a disk harrow, a front frame, gangs of disks connected with said frame, and adjustably movable fore and aft, gang adjusting devices carried by said frame and adapted to be operated to adjust said gangs, a rear frame pivotally coupled with the front frame, gangs of disks connected with said rear frame and adjustably movable fore and aft, gang adjusting devices adapted to be operated to adjust said rear gangs, and independently operable rotating means for operating each of said gang adjusting devices, said rotating means being supported to turn about the same axis.

12. In a disk harrow, a front frame, gangs of disks connected with said frame, and adjustably movable fore and aft, gang adjusting devices carried by said frame for adjusting said gangs, a rear frame pivotally coupled with the front frame, gangs of disks connected with said rear frame and adjustably movable fore and aft, gang adjusting devices adapted to be operated to adjust said rear gangs, and independently operable self locking means carried on said front frame for operating each of said gang adjusting devices.

13. In a disk harrow, a front frame, gangs of disks movably connected with said frame, a rear frame pivotally coupled with the front frame, gangs of disks movably connected with said rear frame, and separately operable, rotatable means mounted on the front frame for adjusting the sets of gangs one independently of the other.

14. In a disk harrow, a front frame, gangs of disks connected with said frame and adjustably movable forward and backward, devices carried by said frame for adjusting said gangs, a rear frame pivotally coupled with the front frame, gangs of disks connected with said rear frame and adjustably movable forward and backward, gang adjusting devices adapted to be operated to adjust said rear gangs, two independently operable screw actuated devices respectively associated with the two sets of gang adjusting devices, two threaded power transmitting devices respectively cooperating with the aforesaid screw actuated devices, and two power devices co-axially mounted on the front frame for rotating respectively the said threaded power transmitting devices.

15. In a disk harrow, a front frame, gangs of disks movably connected with said frame, a rear frame pivotally coupled with the front frame, gangs of disks movably connected with said rear frame, and concentric devices mounted on one of said frames and separately operable to adjust the sets of gangs independently of each other.

16. In a disk harrow, a front frame, gangs of disks movably connected with said frame, a rear frame pivotally coupled with the front frame, gangs of disks movably connected with said rear frame, and rotatable devices mounted on one of said frames and separately operable to adjust the sets of gangs independently of each other.

17. In a disk harrow, a front frame, gangs of disks movably connected with said frame, a rear frame pivotally coupled with the front frame, gangs of disks movably connected with said rear frame, and rotatable devices concentrically mounted on one of said frames and separately operable to adjust the sets of gangs independently of each other.

HERBERT B. McKAHIN.